United States Patent [19]

Marron

[11] Patent Number: 5,073,021

[45] Date of Patent: Dec. 17, 1991

[54] BIFOCAL OPHTHALMIC LENS CONSTRUCTED FROM BIREFRINGENT MATERIAL

[75] Inventor: Joseph C. Marron, Brighton, Mich.

[73] Assignee: Environmental Research Institute of Michigan, Ann Arbor, Mich.

[21] Appl. No.: 324,827

[22] Filed: Mar. 17, 1989

[51] Int. Cl.⁵ .......................... G02C 7/06; G02C 7/04; G02B 5/30; A61F 2/16

[52] U.S. Cl. .................................. 351/168; 351/159; 351/161; 351/164; 351/171; 623/6; 359/494; 359/495

[58] Field of Search ................. 350/374, 379, 400–407; 351/159, 163, 164, 168–172, 160 R, 160 H, 161, 162; 623/6

[56] References Cited

U.S. PATENT DOCUMENTS

| | | | |
|---|---|---|---|
| 3,520,592 | 7/1970 | Leib et al. | 350/379 |
| 3,536,921 | 10/1970 | Caulfield | 350/379 |
| 3,592,533 | 7/1971 | Braunhut | 350/406 |
| 3,944,346 | 3/1976 | Shindler | 350/407 |
| 4,155,122 | 5/1979 | Budmigar | 350/374 |
| 4,302,081 | 11/1981 | Tseutaki | 351/161 |
| 4,550,984 | 11/1985 | Raymond | 350/404 |
| 4,637,697 | 1/1987 | Freeman | 351/161 |
| 4,641,934 | 2/1987 | Freeman | 351/159 |
| 4,642,112 | 2/1987 | Freeman | 623/6 |
| 4,655,565 | 4/1987 | Freeman | 351/159 |
| 4,783,152 | 11/1988 | Nishimoto | 350/379 |

OTHER PUBLICATIONS

W. N. Charman, "Diffractive Bifocal Contact Lenses", Contax, 11, (May 1986).
S. St. Cyr, "The Holographic Bifocal Contact Lens", Holosphere, vol. 15, No. 5, (Fall 1988).

Primary Examiner—Scott J. Sugarman
Attorney, Agent, or Firm—Krass & Young

[57] ABSTRACT

A dual focal length ophthalmic lens is formed from a birefringent material with its fast and slow axes perpendicular to the user's visual axis. The dual focal property arises due to the differing indices of refraction of the birefringent material for light polarized parallel to the fast and slow axes. Light emanating from far objects having one polarization and light emanating from near objects having the opposite polarization are both focused onto the user's retina. Depending upon which object is being viewed, an in-focus and a blurred image appear simultaneously on the user's retina. The ability of the user's eye/brain system to distinguish between the two images provides bifocal action from a single lens. The invention may take the form of a spectacle, contact, or intraocular implant lens.

9 Claims, 2 Drawing Sheets

5,073,021

BIFOCAL OPHTHALMIC LENS CONSTRUCTED FROM BIREFRINGENT MATERIAL

FIELD OF THE INVENTION

The present invention generally relates to ophthalmic lenses and, more particularly, is concerned with ophthalmic lenses formed from birefringent materials which provide a dual focal length capability.

BACKGROUND OF THE INVENTION

Shortly after the age of forty, many people experience a decrease in their ability to accommodate or properly focus their vision on objects located at arbitrary distances. Most commonly, people lose the ability to see near objects within reading distance. This condition is technically known as presbyopia (from the Greek "old eye"), and results from changes in the physiology of the human eye. Presbyopia coupled with the rising average age of the general population has increased the demand for bifocal ophthalmic lenses capable of correcting failing vision.

Conventional ophthalmic bifocal lenses known to the prior art can be classified into two basic categories. The first is the segmented type lens which is composed of distinct parts having differing radii of curvature and/or differing indices of refraction. Thus, the lens has different refractive powers and the user may focus on near objects by viewing through one of the segments or focus on far objects by viewing through the remaining portion of the lens. The second type of conventional bifocal lens consists of a classical refractive lens to which a diffractive element or pattern has been applied. The diffractive element in combination with the refractive power of the lens produces one focal length for near objects, while the undiffracted light from far objects focuses according to the refractive power of the lens. This results in two images being simultaneously present on the user's retina. The user's eye/brain system is then capable of discerning between these two images depending upon whether a near or a far object is being viewed. Examples of the two types of conventional ophthalmic bifocal lenses are described and illustrated in U.S. Pat. No. 4,302,081, issued to G. F. Tsuetaki, and U.S. Pat.No. 4,642,112 issued to M. H. Freeman.

The primary disadvantage of both the segmented lens and the diffractive element lens lies in the difficulty of fabrication which requires special machining or structuring on the surface of the lens. In addition, the segmented lens has problems associated with alignment, particularly when used as a contact lens. Also, the diffracted image resulting from the diffractive element lens can have chromatic aberration and imaging noise due to scattering and higher order diffraction. Excellent discussions of the problems encountered with the prior art bifocal lenses can be found in W. N. Charman, "Diffractive Bifocal Contact Lenses", Contax, 11, (May 1986); and S. St. Cyr, "The Holographic Bifocal Contact Lens", Holosphere, Vol. 15, No. 5, 14, (Fall 1988).

Consequently, a need exists for improvements in bifocal ophthalmic lenses which will result in improved performance and decreased difficulty in manufacture.

SUMMARY OF THE INVENTION

The present invention is directed toward providing a bifocal ophthalmic lens which has improved performance and can be fabricated by conventional lens making techniques thereby avoiding special machining and construction. More particularly, the bifocal diffractive power of the present invention is achieved by forming the lens from a birefringent material having its fast and slow axes perpendicular to the user's visual axis through the lens. Due to the inherent properties of the birefringent material, the lens has one index of refraction for light polarized in the direction parallel to the fast axis, and a larger index of refraction for light polarized in the direction of the slow axis, the slow axis being orthogonal to the fast axis. Natural light which emanates from objects within the user's field of vision can be decomposed into equal amounts of the two polarizations which are parallel to the fast and slow axes of the birefringent material. As a result, one polarization component of light emanating from objects far from the user, and the opposite polarization component of light from near objects can both be focused through the birefringent lens onto the user's retina. Depending upon whether a near or far object is being viewed, an in-focus and a blurred image appear simultaneously on the user's retina. Since the user's eye/brain system is capable of ignoring the blurred image, a bifocal action can be achieved with the use of a single lens.

The present invention may take the form of a spectacle lens for mounting in an eye glass frame, a contact lens for adhering to and floating on the cornea of the user's eye, or an intraocular lens for implanting and replacing the natural lens within the lens capsule of the user's eye. Whichever form the invention takes, the curvature of the lens surfaces and the refractive indices of the birefringent material can be varied to achieve the required refractive corrections for far and near vision in conjunction with other lenses in the user's visual system.

Alternative forms the invention may take are birefringent lenses fused or attached to non-birefringent lenses and birefringent lenses completely encapsulated within the bulk of other non-birefringent lenses. These combinations increase the number of interfacing surfaces which can be varied, thus making it easier to achieve the proper refractive correction for the user.

BRIEF DESCRIPTION OF THE DRAWINGS

The invention will be more fully understood by reference to the following detailed description and accompanying drawings in which.

DESCRIPTION OF THE PREFERRED EMBODIMENTS

Figure 1:
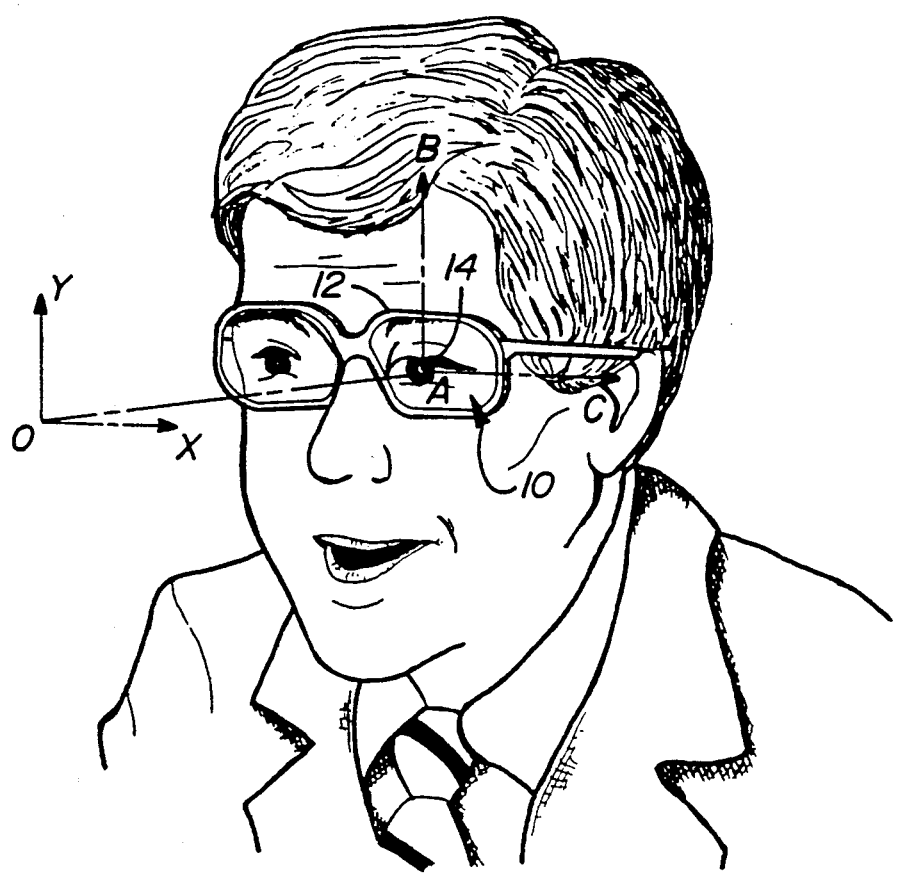
FIG. 1 is a perspective view of a bifocal spectacle lens constituting a preferred embodiment of the present invention.
Figure 2:
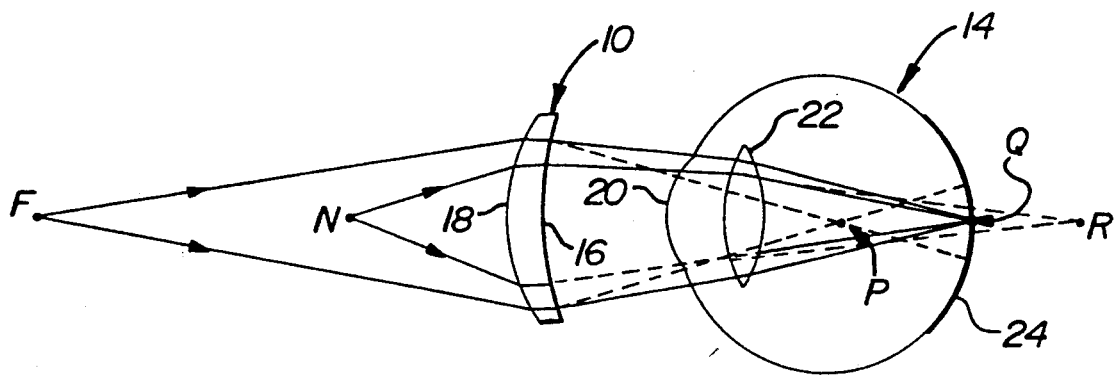
FIG. 2 is a sectional schematic view illustrating the passage of light through the invention embodied as a spectacle lens.

The present invention preferably takes the form of an ophthalmic spectacle lens as illustrated in FIGS. 1 and 2. Structurally, the nature of the lens 10 is identical to conventional spectacle lenses and it can be mounted in an eye glass frame 12 for positioning in front of the user's eye 14. The lens 10 is formed from a birefringent material having its fast axis A-B, and its slow axis A-C, oriented perpendicular to the user's visual axis A-O, with the fast axis A-B and slow axis A-C being orthogonal to each other.

The birefringent material exhibits the inherent property of having one index of refraction for light entering the lens 10 with a polarization in the direction O-Y, parallel with the fast axis A-B, and a different index of refraction for light entering the lens 10 with a polarization in the direction O-X, parallel to the slow axis A-C.

The lens 10 is preferably machined from a solid block of crystalline birefringent material such as calcite using standard lens making techniques; however, it could also be formed as a transparent plastic or polymer lens containing liquid crystal material, by aligning the liquid crystal molecules with an electric field during the polymerization process. When the liquid crystal material is used in forming the lens 10, the difference between the indices of refraction can be adjusted by varying the concentrations of the constituent chemicals comprising the liquid crystal material.

Referring more specifically to FIG. 2, the bifocal action of the birefringent spectacle lens 10 is explained through the refraction of light as it passes through the invention and into the user's eye 14. Natural light can be considered to contain two equal components, one having a polarization parallel to the fast axis A-B and the other having a polarization parallel to the slow axis A-C of the birefringent lens 10. As a result, light emanating from a far object F, with polarization along the fast axis A-B of the birefringent material, is refracted by the bifocal lens 10, the cornea 20, and the natural lens 22 of the user's eye. The curvatures of the posterior face 16 and the anterior face 18 of the spectacle lens 10 are selected in conjunction with the value of the index of refraction along the fast axis of the birefringent material, such that the relatedly polarized component of light from the far object F is focused upon the user's retina 24 at the point Q as indicated by the solid lines. As indicated by the broken lines, a second, out of focus, image results on the user's retina 24, due to the component of oppositely polarized light emanating from the far object F. Light having this polarization is more strongly bent by the lens 10, due to the associated greater index of refraction, and is focused at the point P in front of the retina 24. Thus, when the user views the far object at F, an in-focus and severely blurred image appear simultaneously on the user's retina 24. The user's eye/brain system is capable of ignoring the blurred image, and only the in-focus image is viewed. This feature of having two images simultaneously present on the retina 24 is shared by the prior art segmented and diffractive element type bifocal lenses.

Also shown schematically in FIG. 2 is the path of light emanating from a near object N as it is diffracted through the bifocal lens 10, the cornea 20, and the eye lens 22. Assuming the user to be presbyopic so that his natural lens 22 is incapable of focusing the near object N on the eye's retina 24, the birefringent material is chosen to have its greater index of refraction, corresponding to the slow axis A-C, such that light emanating from the near object N is focused on the retina 24 at the point Q. Also, as shown by the broken lines, the oppositely polarized light from the near object N is focused at the point R and produces a blurred image on the retina 24.

This blurred image is ignored by the user's eye/brain system when viewing the focused image from the near object N. In this fashion, the ophthalmic birefringent lens produces the desired bifocal action which allows the user to view in-focus images of both far and near objects.

As will be understood by those skilled in the art, the invention can be adapted to correct the vision of a particular user. From the lensmaker's formula, it follows that the focal length $f_1$ for light polarized parallel to the fast axis A-B of the birefringent lens 10, and the focal length $f_2$ for light polarized parallel to the slow axis A-C are defined by $$(1/f_1) = (1/r_2)(n_1 - n_4) + (1/r_1)(n_3 - n_1)$$

and $$(1/f_2) = (1/r_2)(n_2 - n_4) + (1/r_1)(n_3 - n_2),$$

where $n_1$ is the index of refraction of the birefringent material for light polarized parallel to the fast axis A-B, $n_2$ is the index of refraction of the birefringent material for light polarized parallel to the slow axis A-C, $r_1$ is the radius of curvature for the posterior or retina facing side 16 of the birefringent lens 10, $r_2$ is the radius of curvature for the anterior or opposite facing side 18 of the lens 10, $n_3$ is the refractive index of the medium in contact with the retina facing side of the lens 16, and $n_4$ is the refractive index of the medium in contact with the opposite facing side of the lens 18. Using the above equations and standard ophthalmic techniques, the birefringent lens 10 can be adapted in conjunction with the other refractive elements of the user's visual system, such as the cornea 20 and the natural lens 22, to produce focused images for both near and far objects on the retina 24 of the user's eye.

Alternatively, the invention could take the form of a conventional bifocal spectacle lens with only the segmented bifocal section of the lens formed of birefringent material. This would provide the user with a trifocal capability, one focal length for viewing far objects through the non-birefringent material and two different focal lengths for viewing near objects through the section formed of birefringent material.

Figure 3:
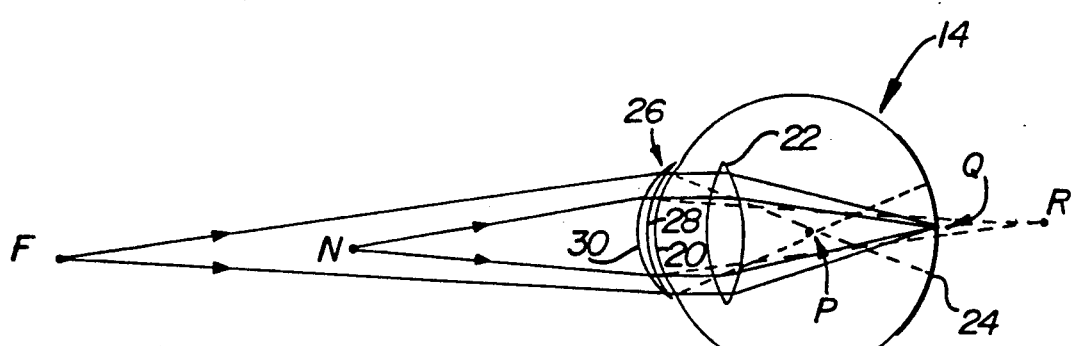
FIG. 3 is a sectional schematic view illustrating the passage of light through the invention embodied as a contact lens.

FIG. 3 is similar to FIG. 2, but shows schematically another embodiment of the invention in the form of a birefringent contact lens 26 having a curvature and shape on the posterior or retina facing side 28 which effectively fits the cornea 20 of the wearer. The anterior or opposite facing side 30 of the contact lens 26 has a radius of curvature which acts in conjunction with the lesser of the indices of refraction for the birefringent material to focus the corresponding polarized light emanating from a far object F on the retina 24 at the point Q. The birefringent material is selected to have its greater index of refraction such that oppositely polarized light emanating from a near object N is likewise focused at the point Q on the user's retina 24. Depending upon which object the user is viewing, the eye/brain system again distinguishes between in-focus and blurred images to achieve a bifocal action.

Figure 4:
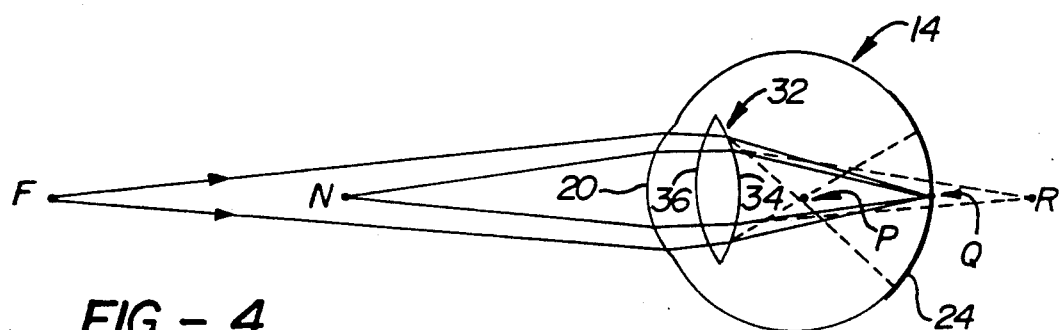
FIG. 4 is a sectional schematic view illustrating the passage of light through the invention embodied as an intraocular implant lens.

FIG. 4 shows schematically an additional embodiment of the invention in the form of an intraocular implant lens 32 which replaces the natural lens residing in the lens capsule of the user's eye 14. The implant lens 32 has a posterior or retina facing side 34 and an anterior or opposite facing side 36. These sides are shaped in conjunction with the indices of refraction for the birefringent material to focus both far and near objects on the user's retina 24 as explained previously in the descriptions for the other embodiments of the invention.

Figure 5:
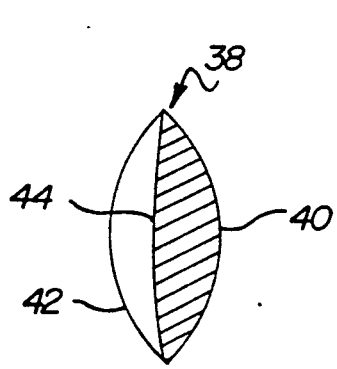
FIGS. 5 and 6 are sectional schematic views of two alternative birefringent lens arrangements for practicing the invention.
Figure 6:
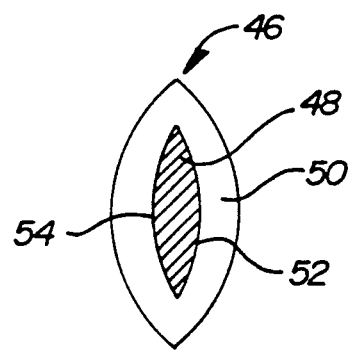

FIGS. 5 and 6 are schematic cross-sections through two additional embodiments of the bifocal birefringent lens. Referring to FIG. 5, the lens 38 is a combination of a birefringent lens 40 and a non-birefringent lens 42 which are fused or attached together in the form of a doublet. With reference to FIG. 6, the lens 46 is formed by completely encapsulating a birefringent lens 48 within the bulk of a non-birefringent lens 50. The advantage of the embodiments shown in FIGS. 5 and 6 are the additional interfacing surfaces 44, 52, and 54, the curvatures of which provide additional variables for flexibility in adapting the invention to correct the vision of a specific user, particularly when the indices of refraction for the birefringent material are fixed and cannot be varied.

I claim:

1. An ophthalmic lens formed of birefringent material supported with its central axis coincident with the user's visual axis and with the fast and slow axes of the birefringent material perpendicular to the visual axis, so as to provide one focal length for light polarized parallel to the fast axis and a second focal length for light polarized parallel to the slow axis.

2. An ophthalmic lens as recited in claim 1, wherein the birefringent material has a first index of refraction $n_1$ for light polarized parallel to the fast axis and a second index of refraction $n_2$ for light polarized parallel to the slow axis, the lens having a first focal length $f_1$ for light polarized parallel to the fast axis and a second focal length $f_2$ for light polarized parallel to the slow axis, the focal distances being defined by $$(1/f_1) = (1/r_2)(n_1 - n_4) + (1/r_1)(n_3 - n)$$

and $$(1/f_2) = (1/r_2)(n_2 - n_4) + (1/r_1)(n_3 - n_2),$$

where $r_1$ is the radius of the curvature of the lens on the side facing the user's retina and $r_2$ is the radius of the curvature on the opposite facing side of the lens, $n_3$ is the refractive index of the medium in contact with the retina facing side of the lens and $n_4$ is the index of refraction for the medium in contact with the opposite facing side of the lens.

3. An ophthalmic lens as recited in claim 1, wherein the lens is mounted in a glass frame as a spectacle and is positioned in front of the user's eye.

4. An ophthalmic lens as recited in claim 1, wherein the curvature of the lens on the retina facing side is adapted to fit the cornea of the user's eye as a contact lens.

5. An ophthalmic lens as recited in claim 1, wherein the lens is an intraocular lens, implanted to replace the natural lens within the lens capsule of the user's eye.

6. An ophthalmic lens as recited in claim 1, further including a second lens composed of non-birefringent material placed in direct contact with the birefringent lens, whereby the curvature of the interface between the two lenses can be varied to adjust the difference between the resulting focal lengths for near and far objects.

7. An ophthalmic lens as recited in claim 1, further including a second lens composed of non-birefringent material, the birefringent lens being completely encapsulated within the bulk of the non-birefringent lens, whereby the curvature of the interfaces between the two lenses can be varied to adjust the difference in resulting focal lengths for near and far objects.

8. An ophthalmic lens formed of a birefringent material supported with its central axis coincident with the user's visual axis and with the fast and slow axes of the birefringent material perpendicular to the visual axis, the lens having one focal length for light polarized parallel to the fast axis and a second focal length for light polarized parallel to the slow axis, whereby the lens acts in conjunction with the visual system of the user to produce focused images for both far and near objects on the user's retina.

9. An ophthalmic lens having a first segment formed of non-birefringent material and adapted to provide a focal length for viewing objects far from the user; and including a second segment formed of a birefringent material with the fast and slow axes of the birefringent material being perpendicular to the visual axis through the second segment of the lens, and providing two focal lengths for viewing objects near to the user, whereby a trifocal action is realized with a lens having only two segments.

* * * * *